US008090472B2

(12) United States Patent
Schifman et al.

(10) Patent No.: US 8,090,472 B2

(45) **Date of Patent: *Jan. 3, 2012**

(54) MEDICATION DISPENSING APPARATUS FOR DISPENSING SINGLE ITEMS FROM MULTIPLE-COMPARTMENT BINS

(75) Inventors: Edward J. Schifman, Leawood, KS (US); William A. Bedore, Stilwell, KS (US)

(73) Assignee: Cerner Innovation, Inc., Overland Park, KS (US)

( * ) Notice: Subject to any disclaimer, the term of this patent is extended or adjusted under 35 U.S.C. 154(b) by 232 days.

This patent is subject to a terminal disclaimer.

(21) Appl. No.: 12/347,417

(22) Filed: Dec. 31, 2008

(65) Prior Publication Data

US 2009/0114672 A1 May 7, 2009

Related U.S. Application Data

(63) Continuation of application No. 12/029,285, filed on Feb. 11, 2008.

(60) Provisional application No. 60/889,156.

(51) Int. Cl.
*G06F 17/00* (2006.01)

(52) U.S. Cl. ......... 700/240; 700/243; 700/242; 700/231

(58) Field of Classification Search .................. 700/231, 700/242–243, 232, 240
See application file for complete search history.

(56) References Cited

U.S. PATENT DOCUMENTS

| | | | | |
|---|---|---|---|---|
| 4,690,602 | A | 9/1987 | Castaldi et al. | |
| 5,445,294 | A | 8/1995 | Gardner et al. | |
| 5,499,707 | A | 3/1996 | Steury | |
| 6,416,270 | B1 | 7/2002 | Steury et al. | |
| 6,488,462 | B1 * | 12/2002 | Williams | 414/277 |
| 6,994,409 | B2 * | 2/2006 | Godlewski | 312/297 |
| 7,357,314 | B2 | 4/2008 | Kusakawa | |
| 7,395,945 | B2 | 7/2008 | Godlewski | |
| 7,809,470 | B2 * | 10/2010 | Shoenfeld | 700/243 |
| 2004/0225409 | A1 * | 11/2004 | Duncan et al. | 700/236 |
| 2005/0113968 | A1 * | 5/2005 | Williams et al. | 700/236 |
| 2006/0045674 | A1 * | 3/2006 | Craven | 414/277 |
| 2008/0264967 | A1 * | 10/2008 | Schifman et al. | 221/133 |

OTHER PUBLICATIONS

Final Office Action of U.S. Appl. No. 12/029,285, mailed Mar. 30, 2011.

Non-Final Office Action of U.S. Appl. No. 12/029,285, mailed Sep. 29, 2010.

* cited by examiner

*Primary Examiner* — Michael K Collins

(74) *Attorney, Agent, or Firm* — Shook Hardy & Bacon LLP

(57) ABSTRACT

A medication dispenser provides automation to the steps of locating and acquiring medications to be administered to a patient. The medication dispenser includes an enclosure providing a secure environment for storing medications in multiple sized medication storage bins. The medication storage bins are hung in storage racks located within the enclosure. A robot system is also provided within the enclosure for moving bins between the storage racks and a medication dispensing area. The medication dispensing area includes doors configured to open to define an opening for passing a selected bin through the enclosure. The medication storage bin includes multiple sub-compartments, each configured to receive a single medically related item. The medication storage bin is moved through the opening to present the first sub-compartment containing a medically related item, while other sub-compartment containing medically related items remain within the enclosure.

18 Claims, 9 Drawing Sheets

MEDICATION DISPENSING APPARATUS FOR DISPENSING SINGLE ITEMS FROM MULTIPLE-COMPARTMENT BINS

CROSS-REFERENCE TO RELATED APPLICATIONS

This application is a continuation of U.S. patent application Ser. No. 12/029,285, filed Feb. 11, 2008 and claims the benefit of U.S. Provisional Application No. 60/889,156, filed Feb. 9, 2007. Each of the aforementioned applications is herein incorporated by reference in its entirety. This application is also related by subject matter to the invention disclosed in the following U.S. patent application filed on even date herewith: U.S. application Ser. No. 12/347,260, entitled "Medication Dispensing Apparatus with Bulk Bin Loading," which is assigned or under obligation of assignment to the same entity as this application, and incorporated in this application by reference.

BACKGROUND

As reported by the Institute of Medicine, an estimated 106,000 deaths occurred in 1994 due to adverse drug reactions (ADRs), and more than 2,000,000 hospitalized patients experienced serious, if not fatal, ADRs. Lazarou J. et al., *Incidence of adverse drug reactions in hospitalized patients: a meta-analysis of prospective studies*, J. Am. Med. Assn. 1998: 279: 1200-1205. Many of these errors are attributable to the systems and methods used to store and deliver medications to those clinicians providing care to patients. Various solutions have been proposed to address the issue of medication delivery errors. For instance, computerized systems ensure that the medication ordered or prescribed by the clinician is clinically appropriate. These systems may verify that the dosage is proper based on patient information such as weight and evidence based guidelines or protocols. Also, these systems may perform interaction checking against other medications. However, even if the clinician orders an acceptable medication and dosage amount for a specific patient, the actual drug and/or dosage administered to the patient may vary from what was requested. A pharmacist or other clinician may accidentally provide an improper drug or drug dosage if the order is not properly communicated and followed at each step in the clinical process. Errors may also occur during the steps of the medication administration process occurring between the pharmacy and the point of care. Existing systems and methods for physically transferring and storing and electronically tracking medications and supplied have been employed include automated dispensing machines (ADMs). To administer a medication to a patient, a nurse or other clinician retrieves the appropriate medication from one of a number of ADMs located throughout the healthcare facility. In addition to failing to prevent medication errors, existing systems and methods employing ADMs are wasteful and oftentimes difficult to use.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to an automated medication dispenser. The medication dispenser includes an enclosure providing a secure environment for storing medications and/or other medically related items in multiple sized medication-storage bins. The medication storage bins are hung in storage racks located within the enclosure. A robot system is also provided within the enclosure for moving bins between the storage racks and a medication dispensing area. The medication dispensing area includes doors configured to open to define an opening for passing a selected medication-storage bin through the enclosure. In some embodiments, the doors provide a variable-sized opening and, in some instances, the doors are opened to match the size of a bin containing medications selected for dispensing so the bins may be presented to the user in a secure manner. In embodiments, a selected medication-storage bin contains multiple sub-compartments that are each configured for storing a single medically related item of a given type. The medication-storage bin is moved through the opening such that only one sub-compartment containing a medically related item is presented on the outside of the disclosure while other sub-compartments containing other medically related items remain within the enclosure.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION

Figure 2:
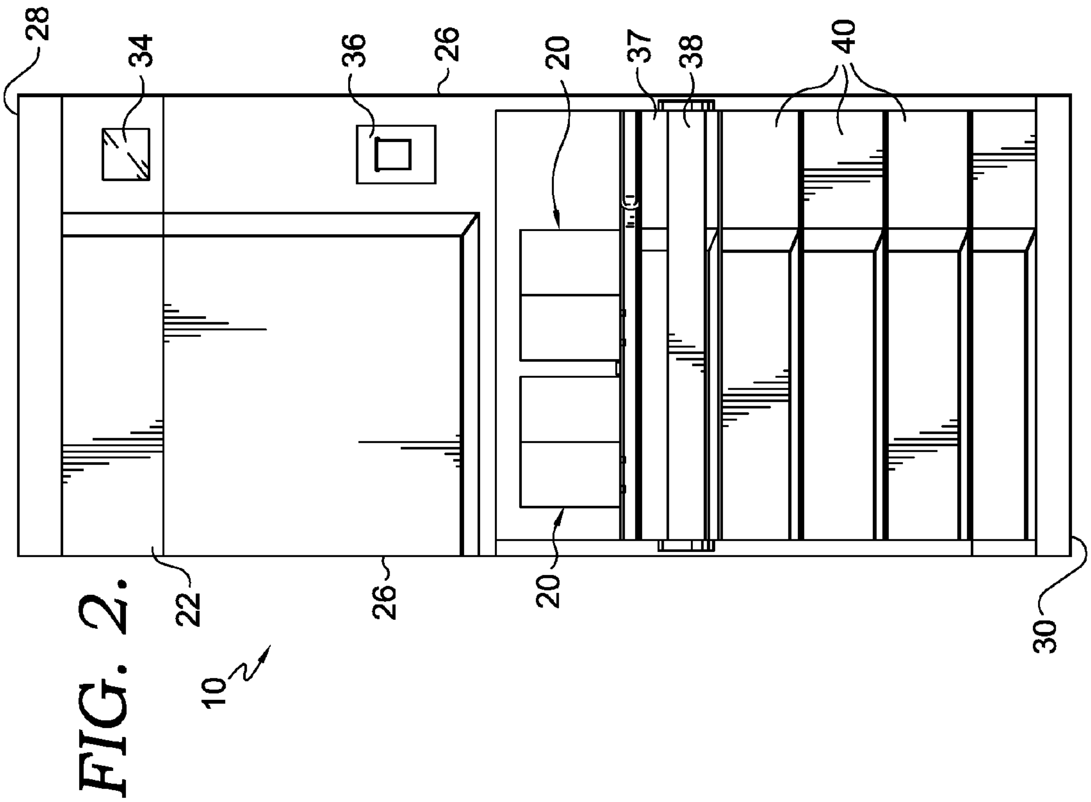
FIG. 2 is a front elevational view of a medication dispenser in accordance with an embodiment of the present invention.
Figure 1:
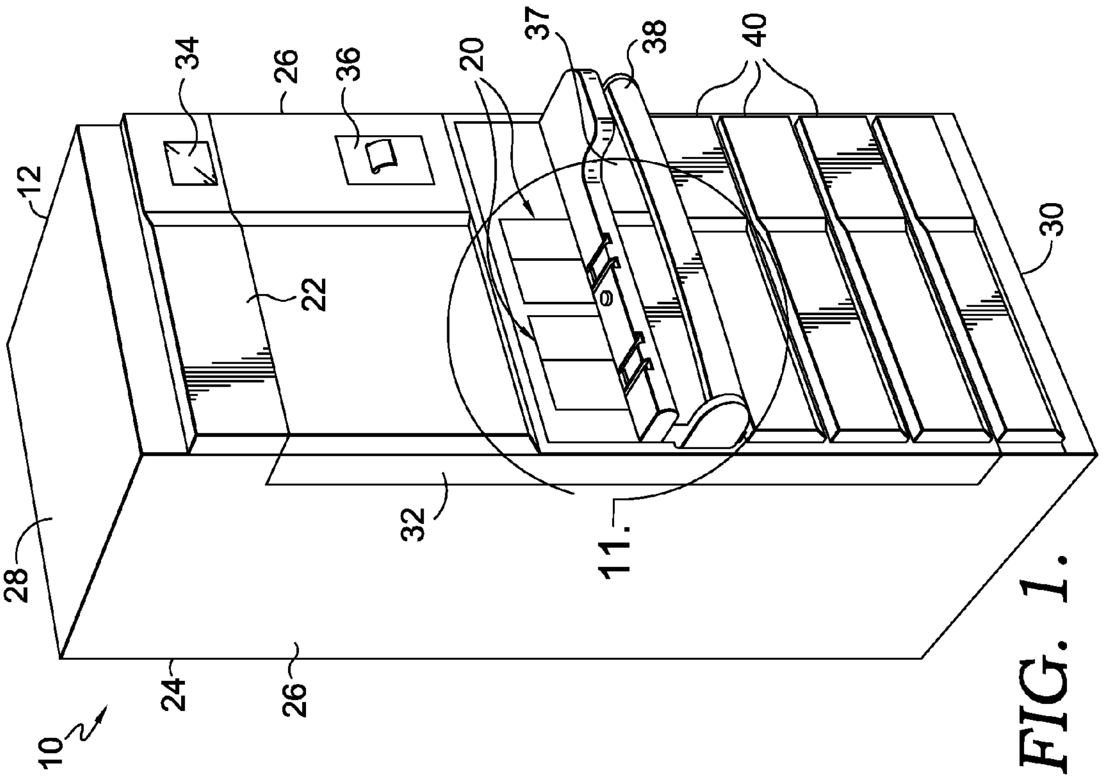
FIG. 1 is a perspective view of a medication dispenser in accordance with an embodiment of the present invention.
Figure 3:
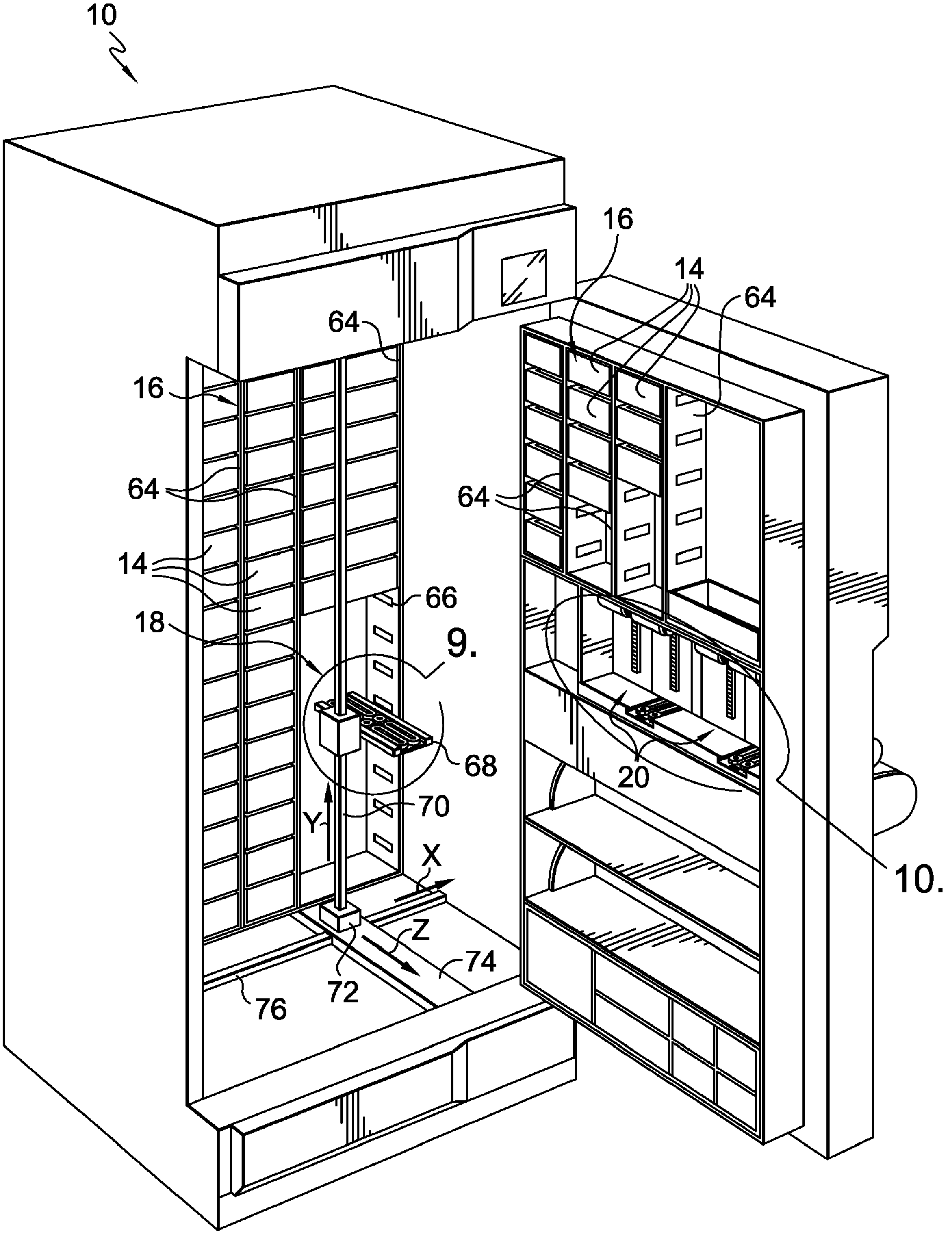
FIG. 3 is a perspective view of a medication dispenser in accordance with an embodiment of the present invention having a door opened showing the interior of the medication dispenser.

With reference to the drawings, wherein like reference characters designate like parts throughout the different views, a medication dispenser according to an embodiment of the present invention is designated generally with the reference numeral 10. The medication dispenser 10 generally includes an enclosure 12 that surrounds other components of the medication dispenser 10, as depicted in FIGS. 1-3. More particularly, the enclosure 12 encases, among other things, a plurality of medication-storage bins 14 disposed in storage racks 16 and a robot system 18 for primarily moving bins 14 between the racks 16 and medication dispensing areas 20 located in the enclosure 12. The medication dispenser 10 stores and dispenses, for instance, unit or multi-dose medications in syringes, ampules, vials, oral suspensions, tubes, jars, oral solids and other packaging options and a variety of medical supplies.

The enclosure 12 provides a controlled environment in which medications are stored. In particular, the enclosure 12 regulates access to the medications, such that only those medications that have been dispensed from a medication dispensing area 20 in the enclosure 12 may be removed from the medication dispenser 10. In some embodiments, a refrigeration unit (not shown) may be coupled with the enclosure 12 to control the temperature and humidity level within the enclosure 12, which is desirable to avoid spoilage of certain types of medication.

The enclosure 12 generally includes a front wall 22, back wall 24, side walls 26, top wall 28, and bottom wall 30. The front wall 22 includes a door 32 allowing access to the internal components of the medication dispenser 12 (e.g., for loading the medication dispenser with medication and for maintenance purposes and the like). However, the door 32 may be locked to prevent unauthorized access to medications within the enclosure 12.

The front wall 22 also generally includes a camera 34, a printer 36, medication dispensing areas 20, a large item dispensing drawer 37, and bulk bin loading drawers 40. The camera 34 is provided for security purposes. In particular, the camera 34 may be used to capture still and/or video images of users interacting with the medication dispenser 10. The printer 36 allows information to be printed, such as, medications dispensed, for instance, for record keeping and to assist clinicians in administering dispensed medications to patients. The large item dispensing drawer 37 allows large medication items to be stored and dispensed when selected by a clinician. For instance, some medications items are too large to be stored in medication-dispensing bins 14 within the enclosure 12 and may be stored and dispensed from the large item dispensing drawer 37. The large item dispensing drawer 37 is lockable to limit access to only authorized clinicians. A handle 38 is attached to each end of the drawer 37 for moving the drawer 37 between a closed position within the enclosure 12 and an open position allowing access and removal of items. The bulk bin loading drawers 40 facilitate loading medication-storage bins 14 into the medication dispenser (as will be described in further detail below).

Figure 4:
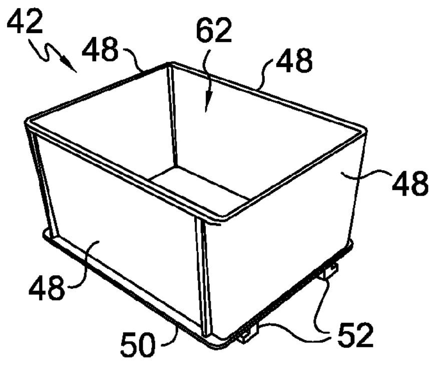
FIG. 4 is a perspective view of a small medication-storage bin in accordance with an embodiment of the present invention.
Figure 5:
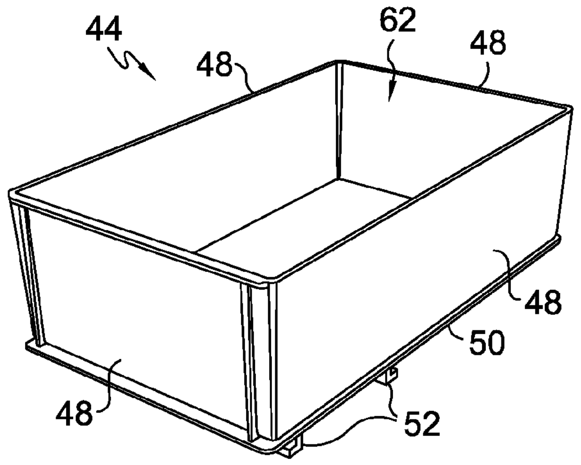
FIG. 5 is a perspective view of a medium medication-storage bin in accordance with an embodiment of the present invention.
Figure 6:
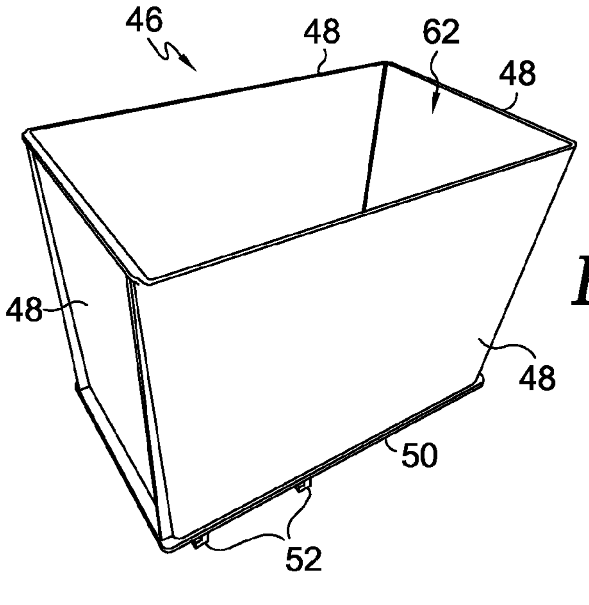
FIG. 6 is a perspective view of a large medication-storage bin in accordance with an embodiment of the present invention.

The medication dispenser 10 is configured to store multiple sized bins 14 for medication storage and dispensing. For instance, referring to FIGS. 4-6, three different sized bins are provided for storing medications in the medication dispenser 12. In particular, a small bin 42 is illustrated in FIG. 4, a medium bin 44 is illustrated in FIG. 5, and a large bin 46 is illustrated in FIG. 6. Multiple sized bins facilitate storing different sized medications, as well as different quantities of medications a particular bin, to allow for the efficient use of space within the medication dispenser 10. Each bin includes four side walls 48 and a base 50 that define a compartment 62 for receiving medications. Additionally, each bin includes a pair of rails 52 positioned on its base 50 to facilitate movement of the bin within the medication dispenser 10 and through the medication dispensing areas 20 (as will be described in further detail below). At least one of the rails 52 includes a series of teeth 54 that may be engaged to facilitate movement of the bin. It should be noted that different bin configurations than those shown in FIGS. 4-8 may be employed in various embodiments of the invention (e.g., different shape, different number of rails, etc.).

Each bin may further include one or more identifiers for identifying the bin. For instance, referring to FIG. 7, in one embodiment, a magnet 56 and a radio frequency identifier (RFID) tag 58 are positioned on the base 50 of the bin. In an embodiment, the magnet 56 identifies the size of the bin. In particular, a magnet having a particular magnetization may be placed on a bin based on the size of the bin. For instance, larger sized bins may include magnets having larger magnetization. Accordingly, a hall effect sensor may then be used to detect the magnetization of a magnet on a bin and to thereby determine the size of the bin. In other embodiments, the magnets may be located in different positions depending on the size of the bin to increase the ability to detect the bin size. In an embodiment, the RFID tag 58 is used to identify the bin, for instance, for identifying medication stored in the bin and determining a storage location of the bin within the medication dispenser 10. It should be understood that in some embodiments, other techniques for identifying a bin, such as bar codes, may be employed.

Figure 8:
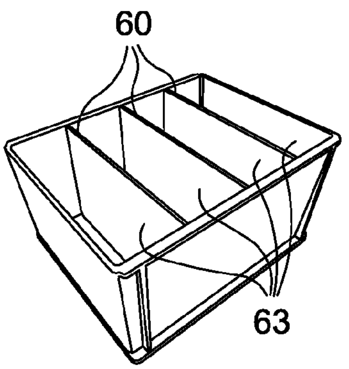
FIG. 8 is a perspective view of a small medication-storage bin having dividers in accordance with an embodiment of the present invention.
Figure 7:
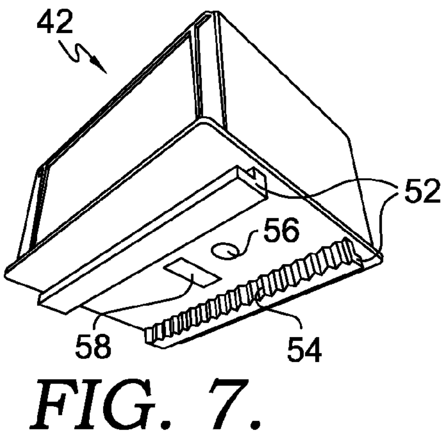
FIG. 7 is a perspective view showing the bottom of a small medication-storage bin in accordance with an embodiment of the present invention.

In some cases, as shown in FIG. 8, a bin may also include a number of dividers 60. The dividers 60 may provide separate sub-compartments 63 in the bin, for instance, for receiving a unit-dose medication in each sub-compartment 63. By including dividers 60 in bins, in some embodiments, the medication dispenser 10 may provide for unit-based medication dispensing (as will be described in further detail below).

As shown in FIG. 3, medication-storage bins 14 are located in storage racks 16 positioned along the interior side of the back wall 24 and the front wall 22. The storage racks 16 include a plurality of vertical rack walls 64 separated from one another at a distance dependent on the size of the bins 14 contained in the medication dispenser 10. A plurality of spring-biased clips 66 are positioned along the vertical rack walls 64 for holding the bins 14 within the storage racks 16. In operation, a pair of spring-biased clips 66 positioned on opposing vertical rack walls 64 engage side walls of a bin 14 to maintain the bin 14 in the racks 16. The spring-biased clips

66 releasably engage the bin 14 to allow the bins to be removed from the racks 16. One skilled in the art will recognize that a variety of other techniques may used for holding the bins 14 within the storage racks 16 within various embodiments of the present invention. Additionally, it should be understood that the configuration of the storage racks 16 shown in FIG. 3 is for illustrative purposes only. As such, the location and spacing of the vertical rack walls 64 within the enclosure 12 are configurable in various embodiments, for instance, to allow for the storage of different quantities of different sized bins 14.

A robot system 18 is provided in the medication dispenser 10 for moving bins 14 within the enclosure 12. For instance, the robot system 18 may move bins 14 between the storage racks 16 and the medication dispensing areas 20 in the front wall 22. The robot system 18 generally includes a sled 68 for engaging and loading bins 14 and a system of rails for moving the sled 68 within the enclosure 12 on an x-y-z axis. In particular, the sled 68 slidably engages a vertical rail 70 allowing the sled 68 to move in the y-direction along the vertical rail 70. The vertical rail 70 has a first end 72 that slidably engages a horizontal rail 74 allowing the vertical rail 70 (and sled 68) to move in the z-direction along the horizontal rail 74. The horizontal rail 74, in turn, slidably engages a fixed horizontal rail 76 allowing the horizontal rail 74 (as well as the vertical rail 70 and sled 68) to move in the x-direction along the fixed horizontal rail 76. Each of the rails 70, 74, 76 may include a flat bar, round post, or other form and may be constructed of metal or other suitable material. Additionally, although only a single rail is shown for each of the rails 70, 74, 76, multiple rails may be employed for each in various embodiments of the invention. Additionally, it should be noted that the robot system 18 described herein is provided for illustrative purposes only and should not be viewed as limiting as other techniques and mechanisms for moving bins 14 within the enclosure 12 may be employed.

Figure 9:
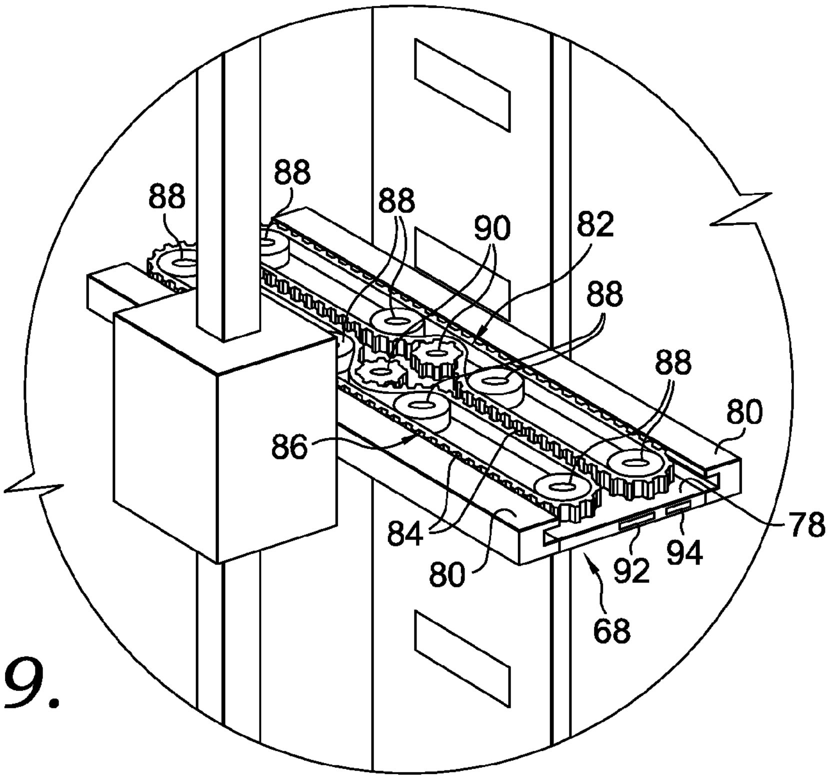
FIG. 9 is a perspective view of a sled for moving medication-storage bins within a medication dispenser in accordance with an embodiment of the present invention.

As shown in FIG. 9, the sled 68 generally comprises a platform 78 with raised edges 80 and includes a dual belt system 82 positioned on the platform 78 for engaging a bin 14 and pulling the bin 14 onto the sled 68. The dual belt system 82 generally includes a pair of toothed belts 84 looped around a series of pulleys 88. The teeth 86 of each toothed belt 84 may engage the teeth 54 located on the rails 52 on the base of a bin 14 (of FIG. 7) to facilitate movement of the bin 14 across the sled 68. A powered gear 90 is also provided for each toothed belt 84 to engage and rotate the toothed belt 84 around the pulleys 88. The rotation of the gears 90 is reversible allowing the dual belt system 82 to move a bin 14 across the sled 68 in both directions. For instance, the toothed belts 84 may be rotated in one direction to retrieve a bin 14 from the storage racks 16 along the back wall 24 and may be rotated in the opposite direction to return a bin 14 to the storage racks 16 along the back wall 24 of FIG. 3.

As shown in the illustrated embodiment of FIG. 9, the sled 68 includes an RFID reader 92 on each end of the platform 78. The RFID reader 92 allows the sled 68 to identify a bin 14 by reading an RFID tag located on the bin 14. An RFID reader 92 is located on each end of the platform 78 to allow an RFID tag to be read on a bin 14 located in racks on either the front wall 22 or the back wall 24 without requiring the sled 68 to engage the bin 14. One skilled in the art will recognize that other techniques, such as bar codes and bar code scanners, may be employed for allowing the sled 68 to identify bins 14 within the medication dispenser 10.

The sled 68 also includes a hall effect sensor 94 on each end of the platform 78, and positional magnets (not shown) are located within the interior of the enclosure 12 for calibrating the robot system 18 to the storage rack configuration. In particular, a positional magnet having a particular magnetization is provided at a home location for the sled 68. To calibrate the robot system 18, the sled 68 is moved to the home location and is then moved through the enclosure to locate the positional magnets and map the configuration. Accordingly, the calibration process allows the robot system 18 to correctly position the sled 68 to engage bins properly during operation, as well as correctly align the sled 68 with the medication dispensing areas 20.

Figure 10:
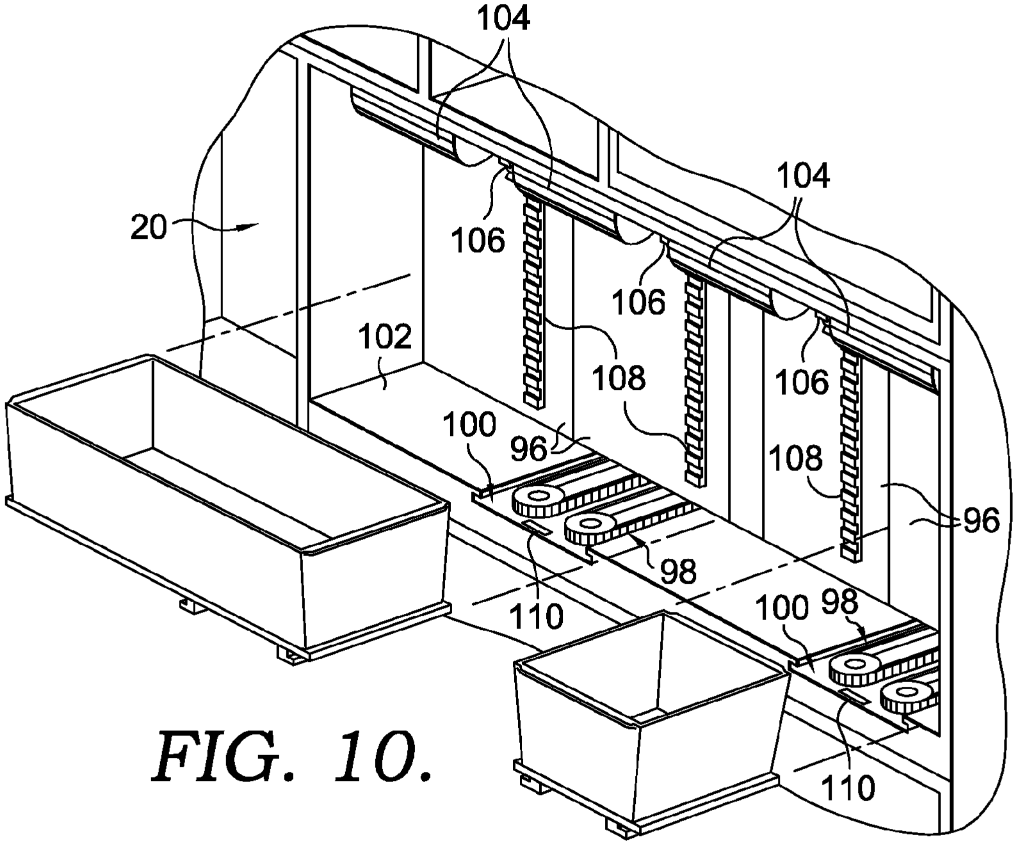
FIG. 10 is a fragmentary perspective view showing the interior of medication dispensing areas in a medication dispenser in accordance with an embodiment of the present invention.
Figure 11:
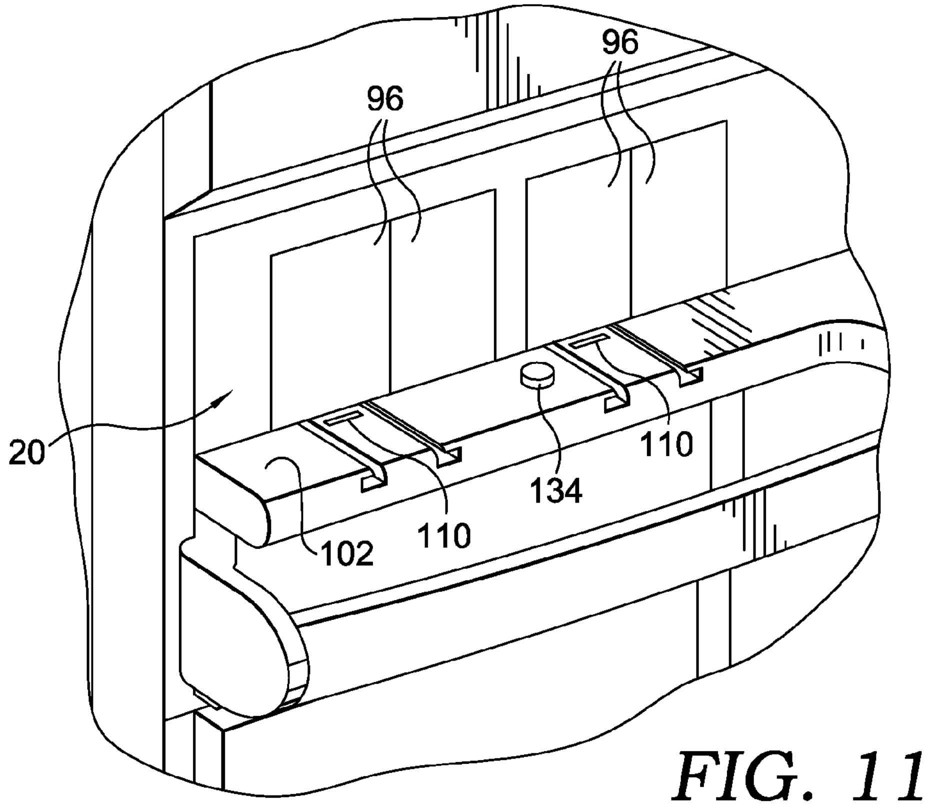
FIG. 11 is a fragmentary perspective view showing the exterior of medication dispensing areas in a medication dispenser in accordance with an embodiment of the present invention.

With reference now to FIGS. 10 and 11, the medication dispensing areas 20 provided in the front wall 22 of the enclosure 12 are further illustrated. The medication dispensing areas 20 allow for the passage of bins 14 through the enclosure 12, primarily for dispensing medications from the medication dispenser 10 but also for loading medications into the medication dispenser 10. Each of the medication dispensing areas 20 generally includes a pair of doors 96 and a dual belt system 98 that is positioned in a recessed area 100 within a medication dispensing shelf 102 formed in the front wall 22. Each dual belt system 98 facilitates movement of bins 14 through the pair of doors 96 and is similar to the dual belt system 82 located on the sled 68 described hereinabove.

Figure 12:
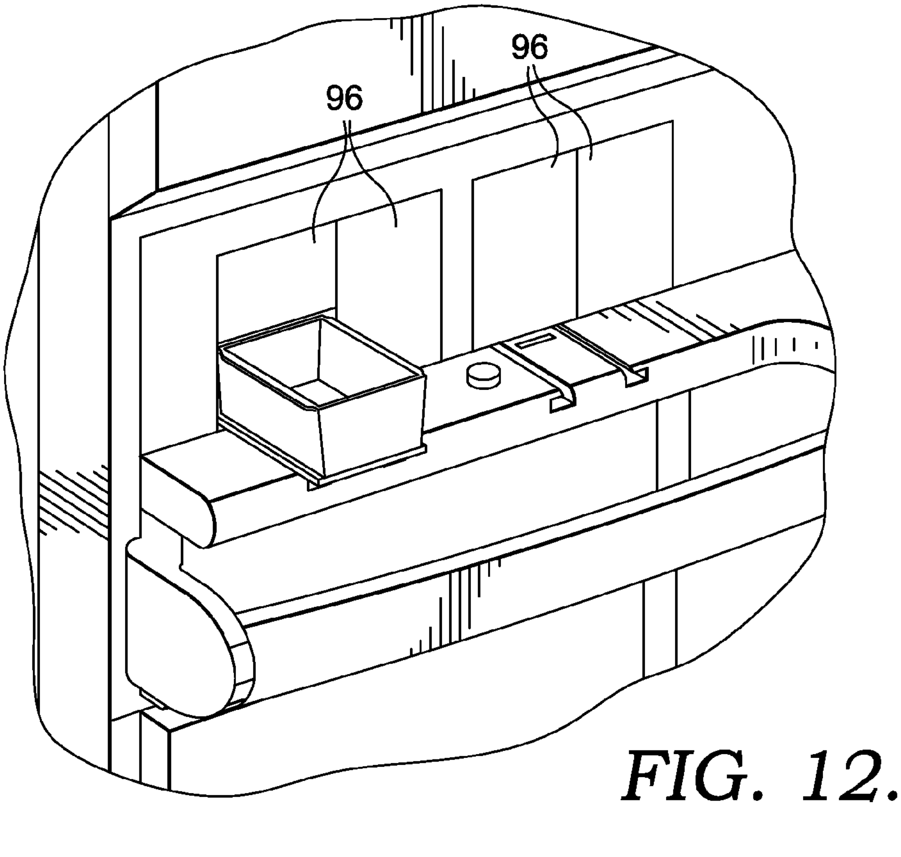
FIG. 12 is a fragmentary perspective view showing passage of a small medication-storage bin through a medication dispensing area in a medication dispenser in accordance with an embodiment of the present invention.

A reversible motor 104 is provided for operating each of the doors 96. The output of each reversible motor 104 is coupled to a gear 106 that engages a toothed track 108 located along a respective door 96 to actuate the movement of the door 96 up and down. Although not required, in some embodiments, the doors 96 are configured to open to provide a variable-sized opening. In an embodiment, the pair of doors 96 for a medication dispensing area 20 are configured to open to match the size of the bin 14 being passed through the medication dispensing area 20 to prevent access to the interior of the enclosure 12. For instance, referring to FIG. 12, the width of a single door 96 matches the width of the small bin, but the height of the door 96 exceeds the height of the small bin. Accordingly, when the small bin is passed through the medication dispensing area 20, a single door 96 is opened to the height of the small bin.

Figure 13:
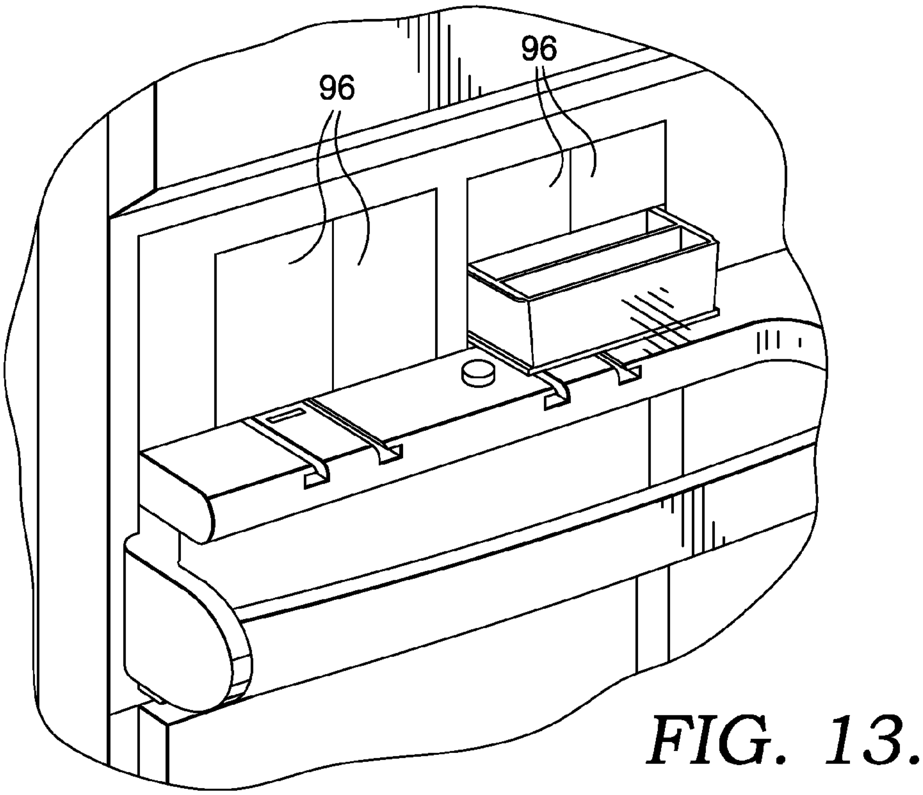
FIG. 13 is a fragmentary perspective view showing passage of a medium medication-storage bin through a medication dispensing area in a medication dispenser in accordance with an embodiment of the present invention.
Figure 14:
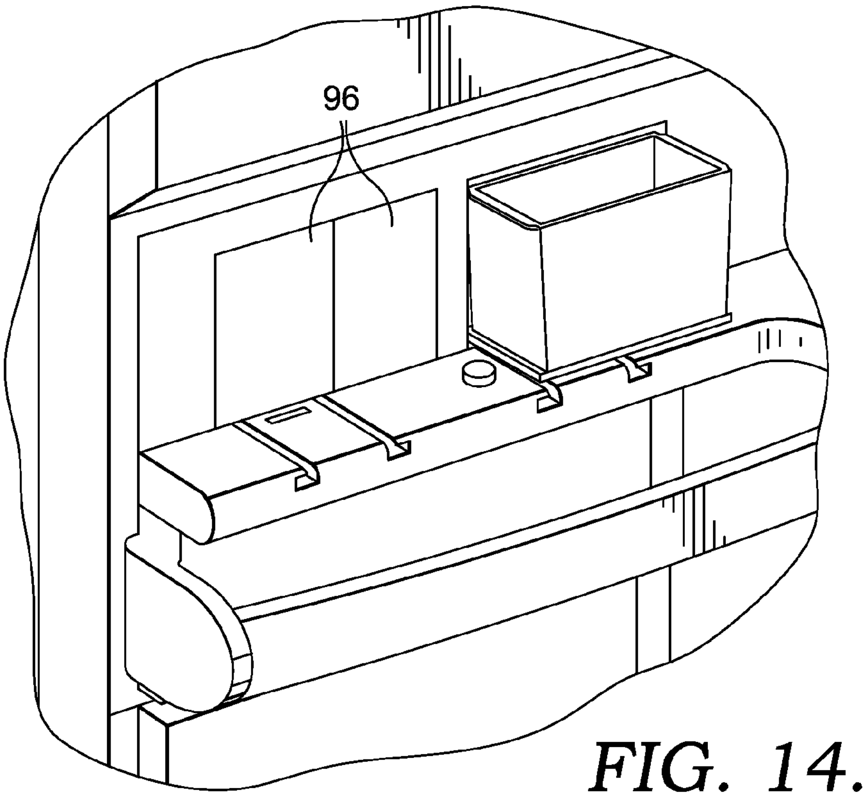
FIG. 14 is a fragmentary perspective view showing passage of a large medication-storage bin through a medication dispensing area in a medication dispenser in accordance with an embodiment of the present invention.
Figure 15:
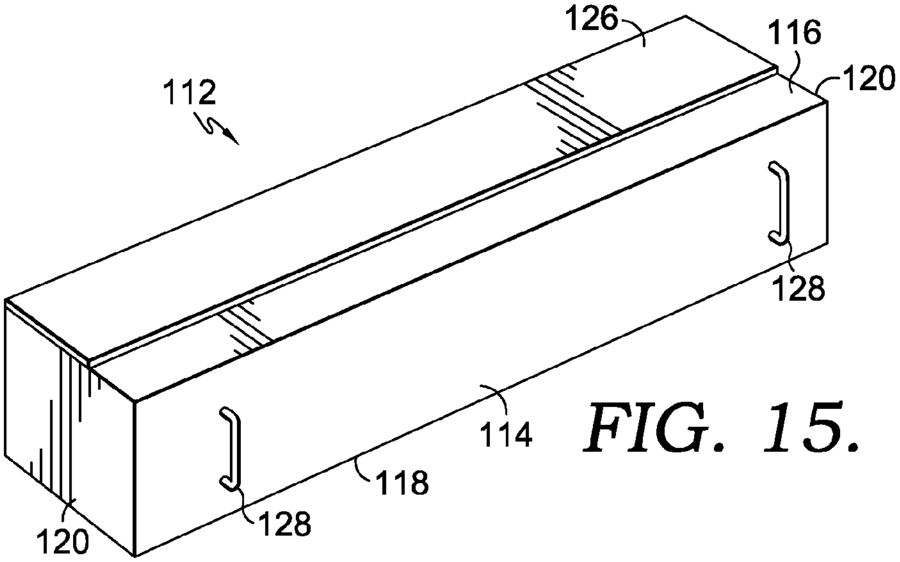
FIGS. 15-17 are perspective views showing a bulk bin cartridge in accordance with an embodiment of the present invention.

As shown in FIG. 13, the width of the pair of doors 96 matches the width of the medium bin, but the height of the door 96 exceeds the height of the medium bin. As such, when the medium bin is passed through the medication dispensing area 20, the pair of doors 96 are opened to the height of the medium bin. Referring now to FIG. 14, the width of the pair of doors 96 matches the width of the large bin, and the height of the pair of doors 96 matches the height of the large bin. Accordingly, when the large bin is passed through the medication dispensing area 20, the pair of doors 96 are opened fully. As can be seen in each of FIGS. 12-14, access to the interior of the enclosure 12 is minimized by opening the doors 96 to match the size of the bin being passed through a medication dispensing area 20.

In the illustrated embodiment shown in FIGS. 10 and 11, hall effect sensors 110 are located on the medication dispensing shelf 102 to identify the size of a bin 14 being presented to a medication dispensing area 20. In particular, hall effect sensors 110 are located adjacent the dual belt system 98 for each medication dispensing area 20 on both the interior and exterior sides of the doors 96. When a bin 14 is presented to a medication dispensing area 20, a hall effect sensor 110 detects the magnetization of a magnet located on the bin 14 to determine the size of the bin 14. The doors 96 are then operated based on the determined bin size.

It should be understood that other techniques for identifying the size of a bin for operating the doors 96 of a medication dispensing area 20 may be employed within embodiments of the present invention. For instance, RFID readers or bar code readers may be located adjacent the dual belt systems 98 in place of the hall effect sensors. The RFID reader or bar code reader may then be employed to determine the size of a bin 14 by detecting an RFID tag or bar code on the bin 14. In another embodiment, a computer system may store information for each bin 14, including the size of the bin 14, and bin size information may be retrieved when a bin 14 is selected to be passed through a medication dispensing area 20. Any and all such variations are contemplated to be within the scope of embodiments of the present invention.

Referring again to FIG. 3, to stock the medication dispenser 10, medications are initially placed into bins 14 and the bins 14 are then hung in the storage racks 16. When medications are placed into each bin 14, the medications and bins 14 are identified to a computer system, which associates the medications with their corresponding bins 14. For instance, a bin 14 may be identified to the computer system by reading an RFID tag or bar code located on the bin 14 or by manually entering a bin identifier. Similarly, in some embodiments, each medication may be provided in a package having an identification marking, such as a bar code, an RFID tag, or some other identifier. A medication may then be identified to the computer system by reading the bar code or RFID tag located on the medication package or by manually entering an identifier associated with the medication.

After medications have been placed into bins 14 and the medications and bins 14 have been associated by the computer system, the bins 14 may be loaded into the medication dispenser 10 in a number of different ways in accordance with various embodiments of the invention. In one embodiment, the medication dispenser 10 is stocked by opening the door 32 and manually placing bins 14 in the storage racks 16. Typically, the medication dispenser 10 is loaded in this manner at the outset of stocking the medication dispenser 10 with medications. When the bins 14 are manually loaded into the medication dispenser 10 in this manner, the location at which each of the bins 14 is placed in the storage racks 16 is provided to the computer system to allow the bins 14 to be subsequently located, for instance, for medication dispensing. In one embodiment, the location of each bin 14 may be manually entered into the computer system. In another embodiment, the location of each bin 14 may be automatically determined. For instance, the sled 68 may be moved through the medication dispenser 10 to identify the location of each bin 14 by reading the RFID tag or other identifier on the bin 14 and to provide the location of the bin 14 to the computer system such that the identifier for the bin 14 and its location may be associated in the computer system.

Typically, after initialing stocking the medication dispenser 10 with medications, further stocking can be accomplished without opening the door 32 in the medication dispenser 12, thereby limiting access to the medications stored therein. In particular, medications may be loaded into the medication dispenser 10 by either loading bins 14 through one of the medication dispensing areas 20 or by using a bulk bin loading drawer 40.

With reference to FIGS. 10 and 11, loading medications using the medication dispensing areas 20 will first be described. Initially, medications are associated with a bin 14 as described hereinabove by identifying the bin 14 and the medications to the computer system. The medications are then placed in the bin 14 and the bin 14 is introduced to one of the medication dispensing areas 20. The bin 14 is placed on the medication dispensing shelf 102, and the bin size is identified by a hall effect sensor 110 to determine the opening of the doors 96 required to match the size of the bin 14 to thereby limit access to medications in the medication dispenser 10. As indicated previously, in some embodiments, the bin size may be determined by other techniques (e.g., by identifying the bin by reading an RFID tag or bar code or by manually entering an identifier for the bin and looking up a stored bin size). The doors 96 are opened to match the determined bin size and the dual belt system 98 is activated to move the bin 14 across the medication dispensing shelf 102 into the medication dispenser 10. The bin 14 is then moved onto the sled 68, which places the bin 14 into the storage racks 16. In one embodiment, a location for the bin 14 may be manually selected when the bin 14 is introduced to the medication dispensing area 20, such that the sled 68 places the bin 14 at that location. For instance, a user may interact with an input device associated with the medication dispenser 10 to select a particular rack location for the bin 14. In another embodiment, a location for the bin 14 may be automatically selected. For instance, the computer system may select a location for the bin 14 and operate the robot system 18 to place the bin 14 at that location. In any case, the computer system stores the location of the bin 14 in the storage racks 16 in association with a bin identifier.

Figure 16:
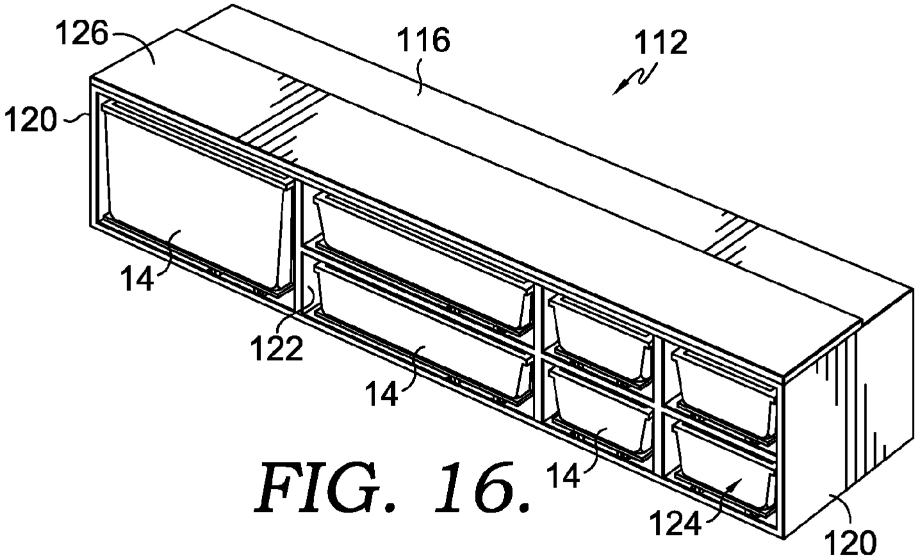
Figure 17:
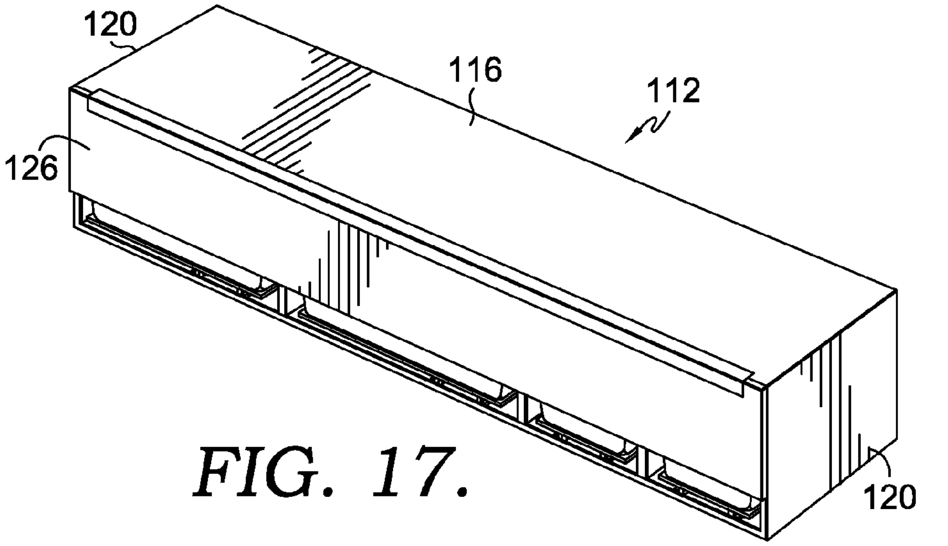

Bins 14 may also be loaded into the medication dispenser 10 in bulk without opening the door 32 by using the bulk bin loading drawers 40 and a bulk bin cartridge 112 as shown in FIGS. 15-19, thereby speeding the loading process for multiple bins 14 as compared to loading bins through the medication dispensing areas 20. Initially, bins 14 are loaded with medications as described hereinabove by identifying the bins 14 and the medications to the computer system and placing the medications into the bins 14. The bins 14 are then loaded into a bulk bin cartridge 112 such as that shown in FIGS. 15-17. The bulk bin cartridge 112 generally includes a front wall 114, a top wall 116, a bottom wall 118, a pair of side walls 120, and a number of interior walls 122 to form compartments 124 for receiving bins 14. The bulk bin cartridge 112 also includes a hinged wall 126 that is hingedly attached to the top wall 116, thereby allowing the hinged wall 126 to be moved from an open position as shown in FIG. 16 (e.g., to allow bins 14 to be put into or removed from the bulk bin cartridge 112) and a closed position as shown in FIG. 17 (e.g., to maintain bins 14 in the compartments 124 when moving the bulk bin cartridge 112). It should be noted that in various embodiments, the hinged wall may be attached in different manners. Additionally, a pair of handles 128 are positioned on the front wall 114 to facilitate carrying the bulk bin cartridge 112.

Figure 18:
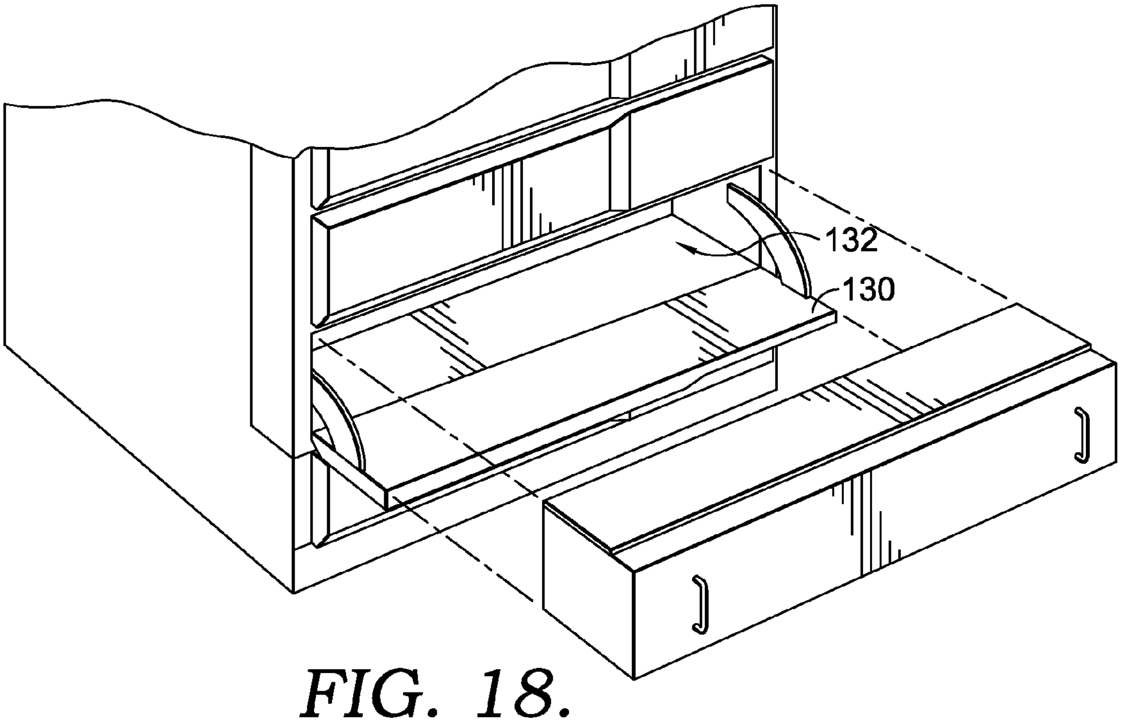
FIGS. 18 and 19 are fragmentary perspective views showing a bulk bin loading drawer in accordance with an embodiment of the present invention.
Figure 19:
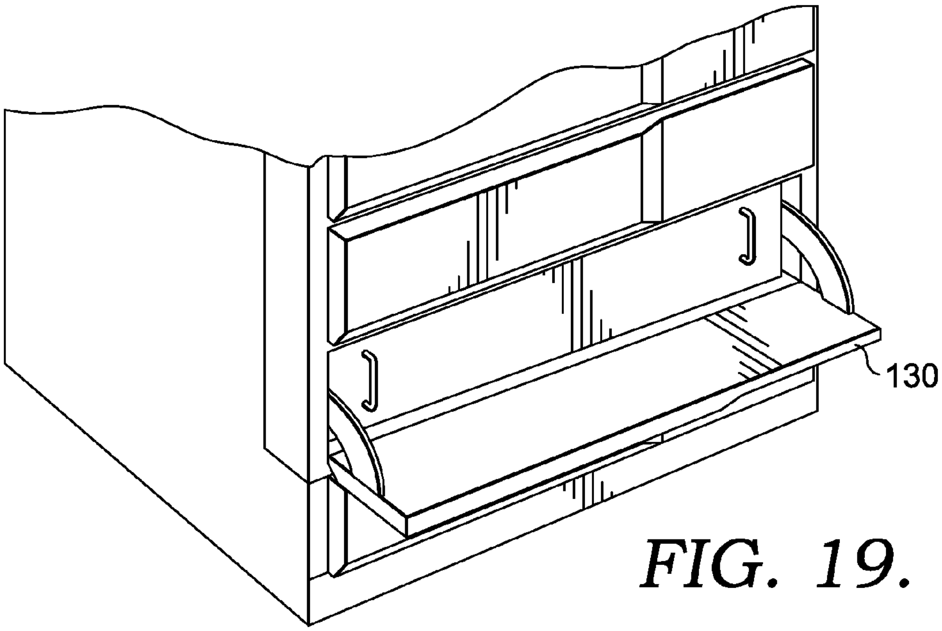

After being loaded with bins 14, the bulk bin cartridge 112 is transported to the medication dispenser 10 for loading the bins 14 into the medication dispenser 10. Each bulk bin loading drawer 40 in the medication dispenser 10 includes a hinged door 130 and a chamber 132 configured for receiving a bulk bin cartridge 112. As shown in FIGS. 18 and 19, to load the bulk bin cartridge 112 into the bulk bin loading drawer 40, the hinged wall 126 on the bulk bin cartridge 112 is moved to the open position to expose the bins 14 in the compartments 124. Additionally, the hinged door 130 for the bulk bin loading drawer 40 is opened, and the bulk bin cartridge 112 is slid into the chamber 132 of the bulk bin loading drawer 40. The robot system 18 is then operated to pick each bin 14 from the bulk bin cartridge 112 and place each bin at a location in the storage racks 16. As indicated above, the location for each bin 14 may be manually or automatically selected, and location information may be stored by the computer system in association with a bin identifier for subsequently locating each bin 14.

Referring again to FIG. 3, some embodiments of the invention employ medication zoning to facilitate the speed of medication dispensing. In particular, bins 14 may be located within the medication dispenser 10 based on the frequency of use of medications contained in each bin. For instance, bins 14 containing medications that are more frequently used may be positioned in the storage racks 16 at locations that reduce the amount of time required to retrieve the bins 14 and move the bins 14 to the medications dispensing area (e.g., the storage racks 16 along the front wall 22 closest to the medication dispensing areas 20).

Empty bins or bins containing stale medications may be removed from the medications dispenser 10 in a manner similar to those discussed for loading the medication dispenser. For instance, bins may be removed by opening the door 32 in the enclosure 12, by employing the medication dispensing areas 20, or by using the bulk bin loading drawers.

When a medication is to be dispensed from the medication dispenser 10, a medication is initially selected, for instance, by a clinician interacting with a computer system associated with the medication dispenser 20. The computer system accesses information associating medications with bins to identify the bin 14 containing the selected medication. Additionally, the computer system determines the location of the bin 14 within the storage racks 16 of the medication dispenser 10. The robot system 18 then moves the sled 68 to the identified location of the bin 14 and engages the bin 14 to move the bin 14 onto the sled 68. After the robot system 18 moves the sled 68 to one of the medication dispensing areas 20, the dual belt system 82 on the sled 68 is operated to move the bin 14 from the sled 68 to the dual belt system 98 of the medication dispensing area 20. The bin size is determined (e.g., by the hall effect sensor 110 or by referring to stored bin size information for the retrieved bin), and the doors 96 are opened to matched the size of the bin 14. The dual belt system 98 then moves the bin 14 across the medication dispensing shelf 102 through the opened doors 96. In some embodiments, the doors 96 remain opened after the bin 14 has been moved to the exterior of the enclosure 12, and a locking mechanism (not shown) is provided to maintain the bin 14 in position on the medication dispensing shelf 102 to prevent access through the opening. In other embodiments, the doors 96 are closed after the bin 14 has been moved to the exterior of the enclosure 12, and the bin 14 may be removed from the medication dispensing shelf 102.

To return the bin 14 to the storage racks 16 in the medication dispenser 10, a bin return button 134 is provided on the medication dispensing shelf 102. When the bin return button 134 is pressed, the dual belt system 98 moves the bin 14 across the medication dispensing shelf 102 to the interior of the enclosure 12 and the doors 96 are closed. In embodiments, two bin return buttons may be located on the medication dispenser 10, and the bin return buttons must be pressed substantially simultaneously to move the bin 14 into the enclosure 12. The robot system 18 then moves the bin 14 from the medication dispensing area 20 back to the storage racks 16. Typically, the bin 14 is placed at the location in the storage racks 16 from which it was previously removed. However, the bin 14 could be placed at a new location in the storage racks 16, which is then stored by the computer system.

The medication dispenser 10 is provided with two medication dispensing areas 20 in the illustrated embodiment to facilitate speed of medication dispensing. In particular, in some cases, a clinician may select multiple medications for dispensing. In such cases, the robot system 18 retrieves a first bin containing a first selected medication and presents the first bin to the first medication dispensing area 20. While the first bin is moved through the medication dispensing area 20, the robot system 18 retrieves a second bin containing a second selected medication and presents the second bin to the other medication dispensing area 20. After the clinician retrieves the first medication from the first bin, the clinician pushes the bin return button 134, causing the first bin to be returned to the interior of the enclosure 12 and the second bin to be moved to the exterior of the enclosure. The robot system 18 returns the first bin to the storage racks 16 and retrieves a bin containing the next selected medication for delivery to the medication dispensing area 20. The process is continued until all selected medications have been dispensed.

In some embodiments, the medication dispenser 10 may be configured to provide unit-dose medication dispensing by employing bins 14 with dividers 60 such as the bin shown in FIG. 8. In operation, a unit-dose medication is placed within each of a number of sub-compartments 63 of the bin. When a unit-dose medication is to be dispensed from the bin, the bin is retrieved from the storage racks 16 and presented to a medication dispensing area 20 as described above. The doors 96 are opened based on the size of the bin, and the dual belt system 98 in the medication dispensing area 20 is operated to move the bin such that only a first sub-compartment 63 is exposed on the exterior of the enclosure 12. As such, only the unit-dose medication in the first sub-compartment 63 may be withdrawn. As medications are dispensed, the computer system tracks how many unit-dose medications have been dispensed from a particular bin. Accordingly, the next time the same medication is selected to be dispensed, the computer system recognizes that a unit-dose medication has been withdrawn from the first sub-compartment 63 in the bin. After the bin has been retrieved and presented to the medication dispensing area 20, the doors 96 are opened and the dual belt system 98 is operated to move the bin such that the first and second sub-compartments 63 are exposed on the exterior of the enclosure 12. Unit-dose medication dispensing continues in this manner by successively exposing the sub-compartment with the next available unit-dose medication until all unit-dose medications have been withdrawn from the bin.

As indicated previously, a computer system is provided for controlling the operation of the medication dispenser 10. In some embodiments, the computer system includes a computing device dedicated to the medication dispenser 10. The medication dispenser computing device may receive inputs, such as inputs associated with bin-loading and medication-dispensing operations. Based on the inputs, the medication dispenser computing device controls the robot system 18 to move bins 14 within the enclosure. Additionally, the medication dispenser computing device controls the operation of the doors 96 and dual belt system 98 for each medication dispensing area 20 based on the inputs.

In some embodiments, the medication dispenser computing device may act as a stand-alone device such that the medication dispenser computing device maintains all data necessary for operating the bin-loading and medication dispensing operations of the medication dispenser 10. In other embodiments, however, the medication dispenser computing device operates within a distributed clinical computing environment. In particular, the medication dispenser computing device may be interfaced with or integrated into a medical information computer system. The medical information computing system may be a comprehensive computing system within a clinical environment such as the exemplary medical information computing system environment 200 shown in FIG. 20. It will be understood and appreciated by those of ordinary skill in the art that the illustrated medical information computing system environment 200 is merely an example of one suitable computing environment and is not intended to suggest any limitation as to the scope of use or functionality of the invention. Neither should the medical information computing system environment 202 be interpreted as having any dependency or requirement relating to any single component or combination of components illustrated therein.

Embodiments of the present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

Embodiments of the present invention may be described in the general context of computer-executable instructions, such as program modules, being executed by a computer. Generally, program modules include, but are not limited to, routines, programs, objects, components, and data structures that perform particular tasks or implement particular abstract data types. Embodiments of the present invention may also be practiced in distributed computing environments where tasks are performed by remote processing devices that are linked through a communications network. In a distributed computing environment, program modules may be located in local and/or remote computer storage media including, by way of example only, memory storage devices.

Figure 20:
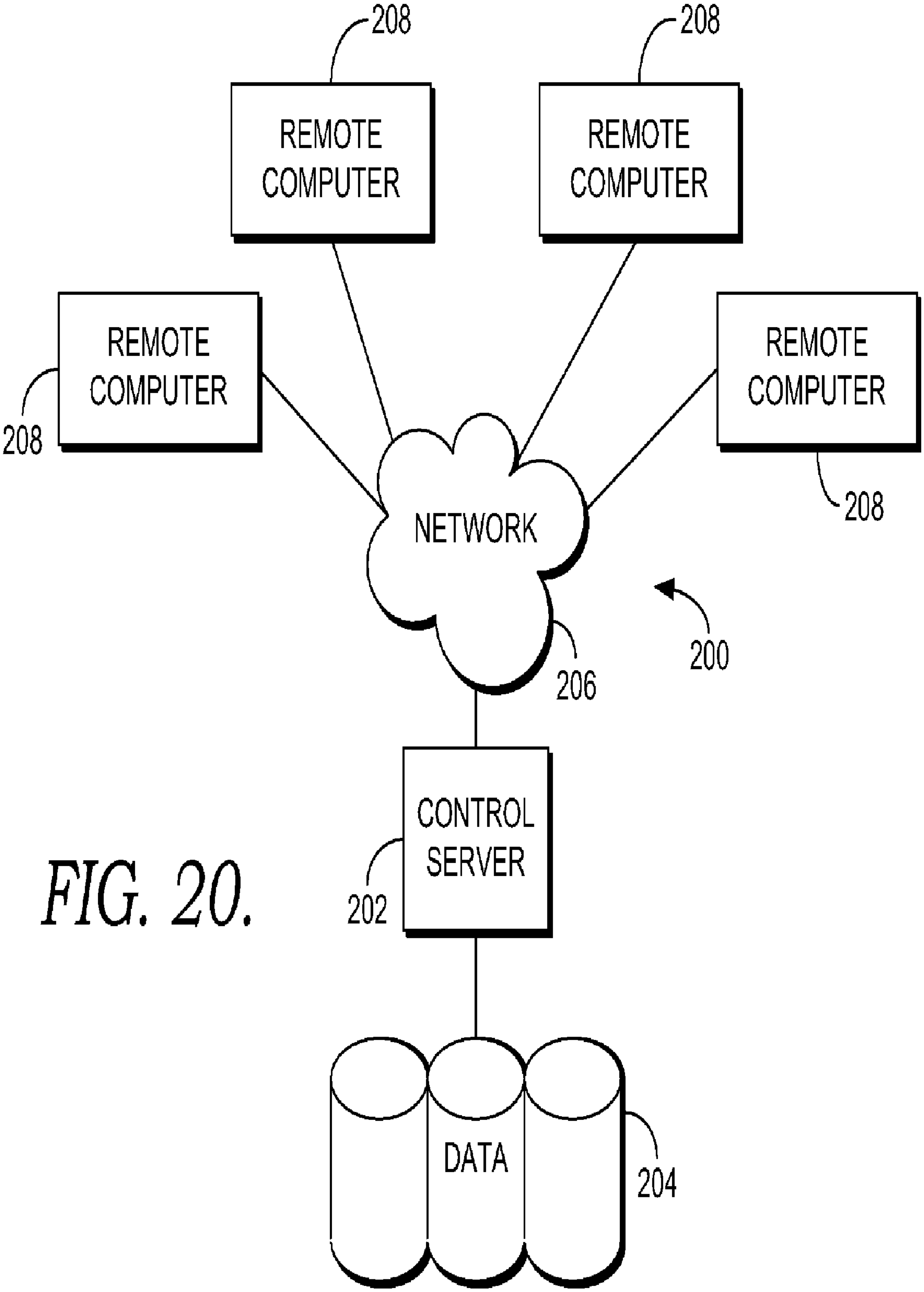
FIG. 20 is a block diagram of an exemplary medication information computing environment suitable for use in implementing the present invention.

With continued reference to FIG. 20, the exemplary medical information computing system environment 200 includes a general purpose computing device in the form of a server 202. Components of the server 202 may include, without limitation, a processing unit, internal system memory, and a suitable system bus for coupling various system components, including database cluster 204, with the server 202. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 202 typically includes, or has access to, a variety of computer readable media, for instance, database cluster 204. Computer readable media can be any available media that may be accessed by server 202, and includes volatile and nonvolatile media, as well as removable and non-removable media. By way of example, and not limitation, computer readable media may include computer storage media and communication media. Computer storage media may include, without limitation, volatile and nonvolatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 202. Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 1, including database cluster 204, provide storage of computer readable instructions, data structures, program modules, and other data for the server 202.

The server 202 may operate in a computer network 206 using logical connections to one or more remote computers 208. Remote computers 208 may be located at a variety of locations in a medical or research environment, for example, but not limited to, clinical laboratories, hospitals and other inpatient settings, veterinary environments, ambulatory settings, medical billing and financial offices, hospital administration settings, home health care environments, and clinicians' offices. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, genetic counselors, researchers, veterinarians, students, and the like. The remote computers 208 may also be physically located in non-traditional medical care environments so that the entire health care community may be capable of integration on the network. The remote computers 208 may be personal computers, servers, routers, network PCs, peer devices, other common network nodes, or the like, and may include some or all of the components described above in relation to the server 202. The devices can be personal digital assistants or other like devices.

Exemplary computer networks 206 may include, without limitation, local area networks (LANs) and/or wide area networks (WANs). Such networking environments are commonplace in offices, enterprise-wide computer networks, intranets, and the Internet. When utilized in a WAN networking environment, the server 202 may include a modem or other means for establishing communications over the WAN, such as the Internet. In a networked environment, program modules or portions thereof may be stored in the server 202, in the database cluster 24, or on any of the remote computers 208. For example, and not by way of limitation, various application programs may reside on the memory associated with any one or more of the remote computers 208. It will be appreciated by those of ordinary skill in the art that the network connections shown are exemplary and other means of establishing a communications link between the computers (e.g., server 202 and remote computers 208) may be utilized.

In operation, a user may enter commands and information into the server 202 or convey the commands and information to the server 202 via one or more of the remote computers 208 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 202. In addition to a monitor, the server 202 and/or remote computers 208 may include other peripheral output devices, such as speakers and a printer.

Although many other internal components of the server 202 and the remote computers 208 are not shown, those of ordinary skill in the art will appreciate that such components and their interconnections are well known. Accordingly, additional details concerning the internal construction of the server 202 and the remote computers 208 are not further disclosed herein.

By interfacing and/or integrating a medication dispensing computing device with a comprehensive medical information computing system, such as the medical information computing system 200 of FIG. 20, a number of advantages may be realized. For example, the medication dispensing clinical device may be interfaced with or otherwise access computing devices and/or computing systems in a variety of different clinical domains within a healthcare environment. By way of example only and not limitation, the medical information computing system 200 may include a clinical laboratory system, a pharmacy system, a radiology system, and a hospital administration system. Accordingly, the medical information computing system 200 provides a unified computing architecture that is able to access and aggregate clinical information from a variety of different clinical domains and make the clinical information available to the medication dispensing computing device. In an embodiment, the medical information computing system 200 may store clinical information from different clinical domains in a patient-centric electronic medical record (including an electronic medication administration record) accessible to multiple devices within the system 200, including the medication dispensing computing device. Accordingly, medication dispensing may be automated and clinician workflow may be supported from medication prescribing through medication dispensing and administration. As such, a closed process may be provided that delivers increased patient safety throughout the medication process, greater speed in the medication dispensing process, and improved efficiency for clinicians.

The present invention has been described in relation to particular embodiments, which are intended in all respects to be illustrative rather than restrictive. Alternative embodiments will become apparent to those of ordinary skill in the art to which the present invention pertains without departing from its scope. Substitutions may be made and equivalents employed herein without departing from the scope of the invention as recited in the claims. It will be understood that certain features and subcombinations are of utility and may be employed without reference to other features and subcombinations. This is contemplated and within the scope of the claims.

What is claimed is:

1. A medication dispensing apparatus comprising:

an enclosure;

a plurality of different-sized medication storage bins located at a plurality of storage locations within the enclosure, each medication storage bin being configured to hold one or more medically related items, wherein at least one medication storage bin includes one or more dividers providing two or more sub-compartments within the at least one medication storage bin;

a medication dispensing area having one or more doors in the enclosure for passing a selected medication storage bin through the enclosure, wherein the one or more doors are configured to open to define an opening of variable size, wherein the one or more doors are configured to open to define the opening based on a size of the selected medication storage bin, wherein the one or more doors are configured to open to match the size of the selected medication storage bin, and wherein the medication dispensing area is configured to successively present sub-compartments of the at least one medication storage bin through the one or more doors such that each time a medically related item stored by the at least medication storage bin is requested, a sub-compartment containing a next available medically related item is presented; and a robot system for moving the selected medication storage bin between a corresponding storage location within the enclosure and the medication dispensing area.

2. The medication dispensing apparatus of claim 1, further comprising a plurality of racks within the enclosure, the plurality of racks providing the plurality of storage locations for storing the plurality of medication storage bins.

3. The medication dispensing apparatus of claim 1, wherein the medically related items comprise one or more of the following: unit-dose medications, multi-dose medications, syringes, ampules, vials, oral suspensions, tubes, jars, oral solids, and medical supplies.

4. The medication dispensing apparatus of claim 1, wherein the medication dispensing apparatus further comprises a large item dispensing drawer for storing and dispensing medically related items that are too large to be stored in the medication storage bins.

5. The medication dispensing apparatus of claim 1, wherein each medication storage bin includes one or more rails disposed on a bottom of the medication storage bin to facilitate movement of the medication storage bin within the medication dispensing apparatus.

6. The medication dispensing apparatus of claim 5, wherein the robot system comprises:

a platform; and one or more belt systems for engaging the one or more rails on the selected medication storage bin and moving the selected medication storage bin on and off the platform.

7. The medication dispensing apparatus of claim 5, wherein the medication dispensing area includes one or more belt systems for engaging the one or more rails on the selected medication storage bin and moving the selected medication storage bin across the medication dispensing area and through the one or more doors.

8. The medication dispensing apparatus of claim 1, wherein each medication storage bin includes one or more identifiers for identifying the medication storage bin.

9. The medication dispensing apparatus of claim 8, wherein the one or more identifiers comprise one or more of the following: a radio frequency identifier tag, a bar code, and a magnet.

10. The medication dispensing apparatus of claim 8, wherein the robot system includes at least one detector for detecting at least one of the one or more identifiers on the medication storage bins to identify the medication storage bins.

11. The medication dispensing apparatus of claim 10, wherein the at least one detector comprises one or more of the following: a radio frequency identifier reader, a bar code scanner, and a hall effect sensor.

12. The medication dispensing apparatus of claim 8, wherein the medication dispensing area includes at least one detector for detecting at least one of the one or more identifiers on the medication storage bins to identify the medication storage bins.

13. The medication dispensing apparatus of claim 1, wherein the medication storage bins are located at storage locations within the enclosure based on a frequency of use of medically related items contained in each medication storage bin.

14. A method for dispensing medications from a medication dispensing apparatus, the method comprising:

receiving a selection of a type of medically related item;

determining a medication storage bin containing a plurality of medically related items of the selected type, the medication storage bin being located at a storage location within the medication dispensing apparatus, wherein the medication storage bin includes one or more dividers providing two or more sub-compartments within the medication storage bin, wherein each sub-compartment contains a medically related item of the selected type;

determining the storage location of the medication storage bin within the medication dispensing apparatus;

using a robot system within the medication dispensing apparatus to retrieve the medication storage bin from the storage location and move the medication storage bin to a medication dispensing area, the medication dispensing area having one or more doors in an enclosure of the medication dispensing apparatus for passing the medication storage bin through the enclosure;

opening the one or more doors to define an opening in the enclosure; and moving the medication storage bin through the opening in the enclosure created by opening the one or more doors such that a first sub-compartment of the medication storage bin containing a first medically related item of the selected type is presented outside of the enclosure while remaining sub-compartments of the medication storage bin remain within the enclosure.

15. The method of claim 14, wherein the method further comprises:

using the robot system to return the medication storage bin to the storage location within the medication dispensing apparatus;

receiving a second selection of the type of medically related item;

determining the storage location of the medication storage bin within the medication dispensing apparatus;

determining that the first medically related item has been removed from the first sub-compartment of the medication storage bin;

using the robot system within the medication dispensing apparatus to retrieve the medication storage from the storage location and move the medication storage bin to the medication dispensing area;

opening the one or more doors to define the opening in the enclosure; and moving the medication storage bin through the opening in the enclosure created by opening the one or more doors such that the first sub-compartment of the medication storage bin and a second sub-compartment of the medication storage bin containing a second medically related item of the selected type are presented outside of the enclosure while any remaining sub-compartments of the medication storage bin remain within the enclosure.

16. The method of claim 14, wherein the one or more doors are configured to provide a variable-sized opening and wherein the one or more doors are opened to define the opening based on a size of the medication storage bin.

17. The method of claim 16, wherein opening the one or more doors based on the size of the medication storage bin comprises using a detector located at the medication dispensing area to detect an identifier on the medication storage bin to determine the size of the medication storage bin.

18. A method for dispensing medications from a medication dispensing apparatus, the method comprising:

receiving a selection of a type of medically related item;

determining a medication storage bin containing one or more medically related items of the selected type, the medication storage bin being located at a storage location within the medication dispensing apparatus, wherein the medication storage bin includes one or more dividers providing two or more sub-compartments within the medication storage bin, wherein at least one of the sub-compartments includes a medically related item of the selected type and at least one of the sub-compartments is empty;

determining the storage location of the medication storage bin within the medication dispensing apparatus;

determining a first sub-compartment containing a first medically related item of the selected type;

using a robot system within the medication dispensing apparatus to retrieve the medication storage bin from the storage location and move the medication storage bin to a medication dispensing area, the medication dispensing area having one or more doors in an enclosure of the medication dispensing apparatus for passing the medication storage bin through the enclosure;

opening the one or more doors to define an opening in the enclosure; and moving the medication storage bin through the opening in the enclosure created by opening the one or more doors such that the first sub-compartment of the medication storage bin containing the first medically related item of the selected type is presented outside of the enclosure while any remaining sub-compartments containing any remaining medically related items of the selected type remain within the enclosure.

* * * * *